July 14, 1925.
G. J. OLNEY
1,545,596
CONTINUOUS PROCESS MACHINE FOR HEATING FOOD IN BULK
Filed March 10, 1924　　4 Sheets-Sheet 1
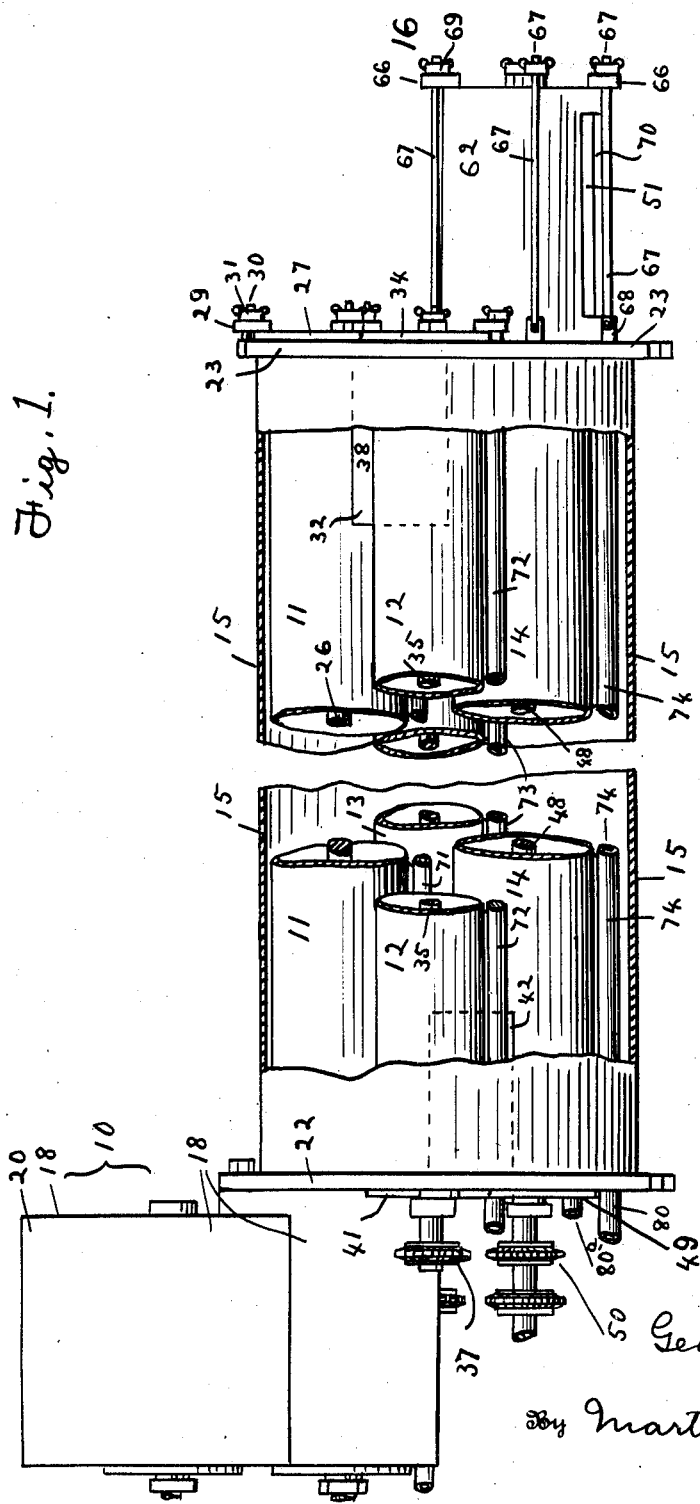
Inventor
George J. Olney
By Martin & Rendell
Attorney

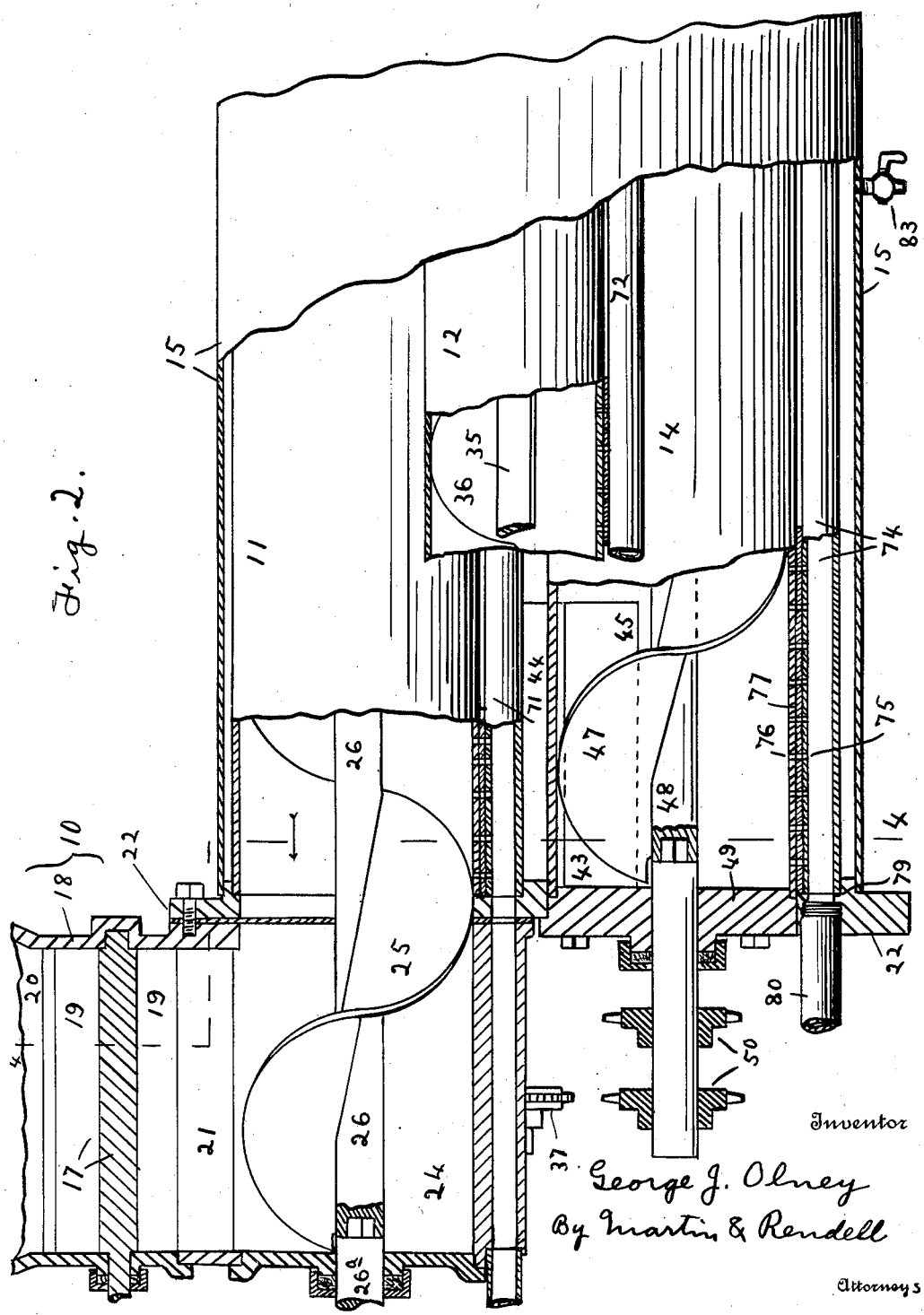

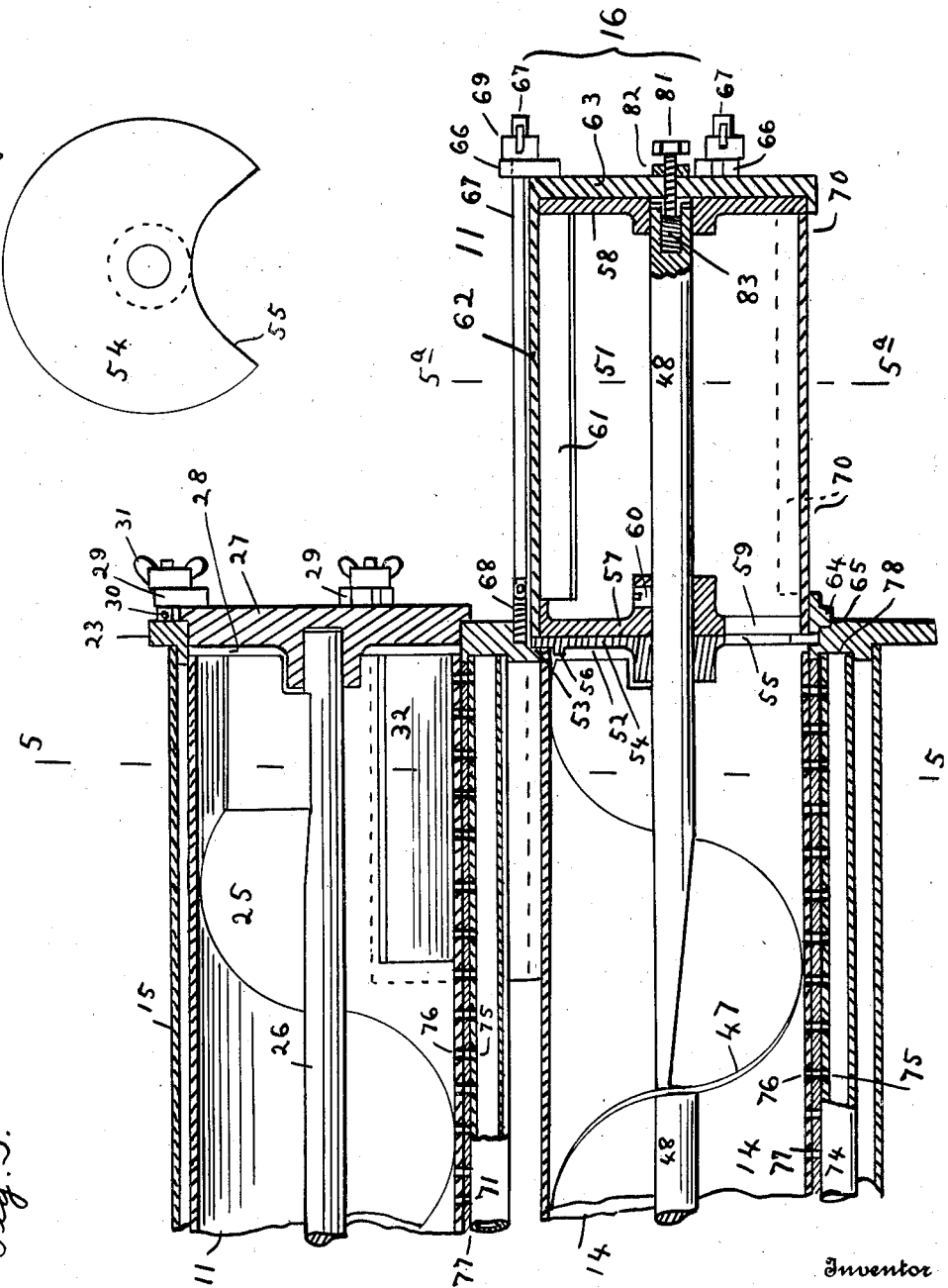

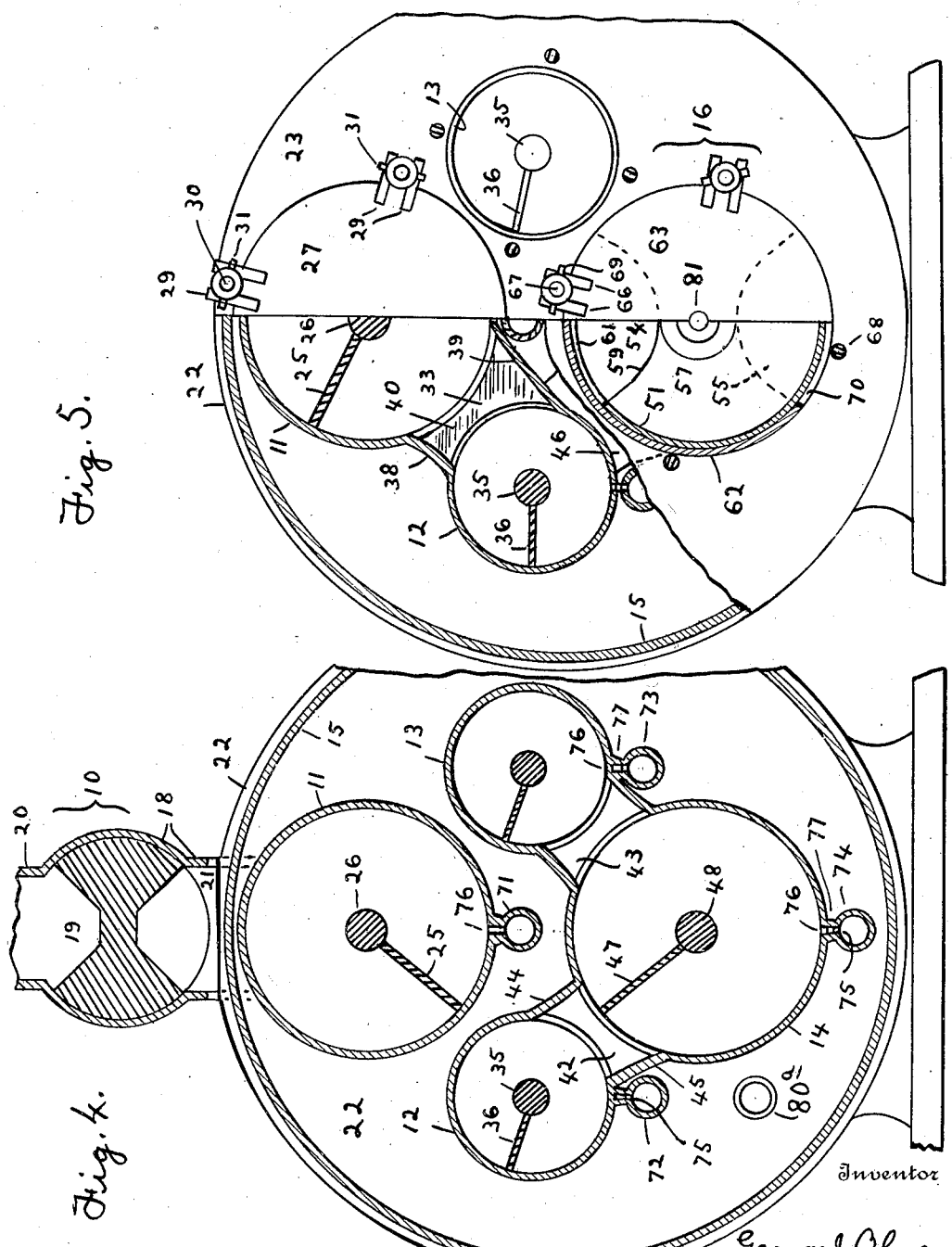

Patented July 14, 1925.

1,545,596

UNITED STATES PATENT OFFICE.

GEORGE J. OLNEY, OF WESTERNVILLE, NEW YORK.

CONTINUOUS-PROCESS MACHINE FOR HEATING FOOD IN BULK.

Application filed March 10, 1924. Serial No. 698,077.

*To all whom it may concern:*

Be it known that I, GEORGE J. OLNEY, a citizen of the United States, and a resident of Westernville, in the county of Oneida and State of New York, have invented certain new and useful Improvements in Continuous-Process Machines for Heating Food in Bulk; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a machine used in the food-canning industry and particularly to a continuous process machine for heating food in bulk.

The purpose of my invention is to provide new and improved machinery well adapted for the continuous process of pre-heating food in bulk, that is for continuously handling loose or bulk food and at the same time imparting thereto as high a degree of temperature as may be necessary or thought proper prior to the packing of the food in the usual separate cans or other containers.

It has recently come to be recognized that the final cooking or more properly sterilization of the food after it has been placed in the receptacles can be greatly shortened in time and rendered more certain by imparting a high degree of temperature to the food immediately before putting it in the cans and while it is still loose or in bulk and so can be moved about or stirred and even subjected to live steam and otherwise treated in ways that are not available after the food has been placed in the can.

It is the purpose of my invention to provide machinery and means well adapted to achieve the above results and to be used in such continuous pre-heating process.

A further purpose is to provide a machine of the class described having provision for subjecting the food to live steam or otherwise bringing it to a temperature which would involve the presence of steam pressure and at the same time have the machine provided with means for successively admitting and discharging portions of food to and from the machine with a minimum amount of loss of such steam pressure.

Another object is to provide a machine of the class mentioned which comprises new and improved and advantageous combinations and arrangements of parts relating to the admission of the food without substantial loss of pressure, the handling of the continuous progressive movement of the food by the positive means through the machine and for simultaneously subjecting it to a thorough heating process and for discharging the food from the machine without substantial loss of said steam pressure.

Another object of the invention is to provide a machine which is very compact and convenient and particularly which provides for a successive back and forth movement of the food through connected heating chambers within an encircling casing so that the food is caused to actually travel several times the real length of the machine thus subjecting the food to heat for a relatively long time and incidentally procuring the advantage of several forms of agitation or shifting of the food about during such back and forth travel through the machine.

Further purposes and advantages of the invention will appear from the specification and claims herein.

Fig. 1 is in general a side elevation of a machine embodying my invention but with parts of the outside jacket or casing removed.

Fig. 2 is a vertical longitudinal section through the rear half of the machine or the left hand end of the machine as shown in Fig. 1.

Fig. 3 is a similar view of a front half or its right hand end as seen in Fig. 1.

Fig. 4 is a sectional view on line 4—4 of Fig. 2.

Fig. 5 is a view in several forms of the front end of the machine, the right hand half and the lower part of the left hand half being an end elevation of the machine with the remainder of the left hand part of said view being a vertical section on line 5—5 of Fig. 3. In this view also the left hand half of the outlet or exit cutoff valve is sectioned on line 5ª—5ª of Fig. 3 and the cap for closing the forward ends of the right hand intermediate the food chamber is removed.

Fig. 6 is a front elevation of the stationary partition forming a part of the outlet cutoff valve.

Referring to the drawings in a more particular description it will be seen that the machine comprises an inlet cutoff valve generally denoted by the numeral 10, a series of connected tubes 11, 12, 13 and 14 with screw conveyors for continuously progressing the food through said connected tubes, pipes for conveying steam to the several food containing tubes and also for supplying steam to the space surrounding the series of said tubes formed by the single enclosing jacket 15 and lastly an outlet or exit cutoff valve denoted generally by the numeral 16.

The inlet cutoff valve is shown at the left hand end of Figs. 1 and 2 and is at what is generally termed the rear of the machine. It consists essentially of a rotating member 17 of general cylindrical form mounted in a casing 18 and having pockets 19. These pockets are adapted to receive the food by gravity through the hopper 20 formed at the top of the casing 18 and discharge the food by gravity as the rotating member 17 is revolved until a given pocket points downwardly into the opening 21 formed at the bottom of the casing 18 which communicates with the entrance or rear end of the upper food heating tube 11. In practice this inlet cutoff valve may also form the means for measuring the amount of different materials going into the food such as corn and separate juice or liquid in the case of canned corn or the means for measuring the different kinds of solid food as corn and beans in the case of succotash. It will be understood that the essential part of this cutoff valve is that while the food will be admitted continuously through the successive pockets emptying their contents into the heating device there will be at no time a clear passage back through the check valve for the escape of steam necessarily present in the main or heating portion of the device. Of course as each pocket empties its contents and then rotates to be out of connection with the main heating chambers each pocket will receive a small portion of steam which will however not ordinarily escape to the atmosphere as that pocket again comes to upward position but will enter the mass of food above the inlet valve. This escape of steam through the inlet cutoff valve and the greater escape of steam through the outlet cutoff valve is, however, of relatively small amount.

The main part of the heating portion or retort of the device is formed by the large upper tube 11, smaller intermediate tubes 12 and 13 at the left hand and right hand respectively as the parts are seen in Figs. 4 and 5 and the large bottom tube 14, being mounted between strong rear and forward heads 22 and 23 respectively, with the jacket 15 encircling all said tubes and likewise secured at its opposite ends to said heads.

At the end of each tube openings are provided in each head preferably of a size corresponding to the outside diameter of said tubes so that the respective tubes may be let into said openings for a part of the thickness of the head, whereby said tubes may be readily permanently fastened to said heads as by welding so as to get steam tight joints at all places.

Preferably the casing 18 in which is mounted the rotating member 17 of the rear cutoff valve extends downwardly not only to form the opening 21 but to form a chamber 24, which is of the full length of said rotating member 17 and is circular in form and of a diameter equal to the inside diameter of the upper tube 11 and directly in line with the chamber formed by said tube 11.

In the said tube 11 and in the said chamber 24 there is rotatably mounted the screw conveyor 25, having its shaft 26 mounted at its rear end in a bearing in the rear end of the depending portion of the casing 18 and with the forward end of said shaft let into a bearing formed in the cap 27, which normally closes opening 28 in the forward head 23 opposite the forward end of upper tube 11.

This cap 27 forms a removable closure and also a removable bearing so that upon said cap being removed access may be had to that end of the upper screw conveyor 25 and also so that said screw conveyor may be readily removed for the frequent washing and cleaning of the conveyor and tube, necessary in all canning machinery. Suitable provision is made for disconnecting the body of the conveyor shaft 26 from the extension thereof 26ª which extends through the bearing at the rear of the casing 18 as by said extension having its forward end reduced in size and squared, fitting into a corresponding square socket formed in the inner end of the main portion of shaft 26. This joint at the inner end of the shaft 26 allows the conveyor to be readily removed and again readily placed in position without disarranging the extension shaft 26ª where it goes through the bearing in the casing 18 and without disarranging the drive gear (not shown) mounted upon said extension shaft.

The cap 27 in the main head fits into the opening 28 in the forward head 23 so as to form a proper bearing support for the forward end of the screw conveyor 25. The cap also has an outwardly extending flange bearing against the outer surface of the forward head 23 to prevent said cap being drawn too far into said opening by the means used to detachably hold said cap in position. Such detachable fastening means conveniently consists of four pairs of outwardly projecting ears 29 secured to or formed integral with said cap and a corresponding number of swinging rods 30 with the outer ends of said rods screw threaded and receiving thumb nuts 31 which bear against the forward surfaces of said ears. The inner ends of the rods 30 are swingingly mounted in split ended plugs 32 screw threaded into the head 23 just outside the flange of said cap 27. It will be obvious that upon loosening the thumb nuts 31 a little the rods 30 may be swung away from the cap 27, allowing said cap to be readily removed.

It will be understood that the screw conveyor 25 in the upper tube 11 is of such form and is so driven as to convey the food that falls from the pocketed revolving member 17 into the chamber 24 forwardly through said chamber 24 and through said tube 11.

At the forward end of said upper tube 11 the lower portion of the tube is cut away so as the food reaches that end of the conveyor it may drop through right and left hand ports 32 and 33 respectively into the forward end of the smaller intermediate return tubes 13 and 12 respectively. The forward ends of these tubes 12 and 13 are closed by caps 34. These caps are similar in arrangement and attachment to the cap 27 already described and are also provided with bearings at their inner side to support the forward end of the shaft 35—35 of the conveyors 36—36 mounted in said two intermediate tubes. These screw conveyors 36—36 are of such formation and so driven by sprocket wheels 37 mounted upon the rear ends of said shafts 35 or extensions thereof at the rear of the rear head 22, that food will be moved rearwardly through the tubes 12 and 13.

The ports 33 connecting the forward end of the upper tube with the forward ends of the two intermediate tubes 12 and 13 may conveniently be formed by utilizing the inner side of the forward head 23 for the forward side of said ports, by having formed upon said head upper and lower wings 38 and 39 forming the upper and lower sides of said port as shown particularly in Fig. 5, with a web 49 connecting the rear of said wings 38 and 39 to form the rear side of said port. As shown in said Fig. 5 the portion of said tubes 11, 12 and 13 opposite these ports are cut away and the edges of said tubes are secured as by welding to the edges of the wings 38 and 39 and the web 40.

The openings at the rear end of the intermediate tubes 12 and 13 are closed by removable caps 41 similar in the main in construction to the cap 27 already described but held in place by cap screws. These caps 41 however, will have the shafts 35 of the screw conveyors 36 pass through the bearings in said caps to provide for the driving of said conveyors from the sprocket wheels 37 already mentioned.

The rear end of the intermediate tubes 12 and 13 are connected by ports 42 and 43 respectively at the lower inward sides of said tubes to the upper portion of the bottom large tube 14. These ports 42 and 43 are similar in construction to the ports 32 and 33 already described, in that upon the rear head 22 there are formed forwardly projecting upper and lower wings 44 and 45 respectively connected at their forward ends with a web 46 forming the forward side of said ports. It will be understood that the portions of the several tubes opposite these ports are cut away and the edges of said tubes are suitably secured to the edges of said wings and web. It will now be seen that as the screw conveyors in the two intermediate tubes 12 and 13 convey the food to the rear end of the said tubes the food will fall or be forced through said port 42 and 43 into the rear end of the bottom tube 14.

In this bottom tube 14 is mounted a screw conveyor 47 on shaft 48. The rear end of this shaft has its bearing provided in the cap 49 with said conveyor driven from sprocket wheel 50 at the rear of said cap. This cap sets into the rear head 22 from the rear of said head and is fastened thereto as already described with reference to the caps 34 at the rear of the intermediate tubes.

A joint similar to that already described for the joint in the upper conveyor shaft 26 near its rear end is provided for each intermediate conveyor shaft 25 and for the lower conveyor shaft 48 just within the co-operating rear caps 41 and 49 respectively. These joints allow said conveyors and their shafts to be removed forwardly without displacing the portion of the shaft extending through the rear caps.

The screw conveyor 47 in the bottom tube 14 extends forwardly or to the right as seen in Fig. 3 only as far as the length of the said lower tube 14; but the shaft 48 of this screw conveyor extends farther front into the cutoff valve 11 in order to provide the means for rotating the movable cylindrical member 51 of said outlet cutoff valve. Opposite the forward end of the bottom tube 14 there is provided in the forward head 23 an opening 52 into the inner end of which extends and is securely fastened the forward end of said tube. Beyond said tube this opening is of larger diameter providing a shoulder 53 against which rests the stationary partition 54. This partition as shown more particularly in Fig. 6 is circular in form with an aperture 55 therethrough formed by cutting away said partition for a little more than a quarter of its circumference This partition is removable; but is normally held fixed relative to the head as by an ear 56, projecting into a recess provided in the head 23 adjacent the opening 52. This partition has a central opening therethrough forming a bearing for the shaft 48, which extends through said partition.

Immediately beyond said partition 54 there is mounted upon the shaft 48 the movable cylindrical valve member 51 of the outlet cutoff valve 11. This movable valve member is in the form of a hollow cylinder having its inner end 57 immediately beyond the partition 54 and having its outer end 58 at the outer end of the shaft 48 forming a circular chamber for the food to be passed thereinto at the times when the aperture 55 in the partition registers to a greater or lesser extent with the correspondingly shaped aperture 59 in the inner head 57 of said member 51. Suitable central openings through the end 57 and the end 58 receive the shaft 48. Suitable means as a set screw 60 engaging said shaft in the hub of the end 57 are provided for holding the cylindrical member 51 to rotation with said shaft.

On the side of the movable valve member 51 away from or opposite to the aperture 59 in the end 57 there is provided in the side of the said member 51 an outlet aperture 61, as shown more particularly in Figs. 3 and 5. This aperture extends for about a quarter of the circumference of the valve member and extends substantially the whole length of said member.

The casing 62 closely encircles the movable valve member 51 and has an outer end 63 immediately beyond the outer end 58 of said valve member. The casing 52 however, has no inner end but the end of the circular side wall of said casing sets into the opening 52 in the head 23 and rests directly against the fixed partition 54. An ear 64 upon the casing 62 projecting into a recess 65 formed in the head 23 aids in locating the casing upon the head and prevents any tendency of said casing to rotate.

The casing 62 is removably held in place relative to the head 23 by means of a plurality of tie rods 67. These tie rods are swingingly mounted at their inner ends upon split ended plugs 68 screw-threaded into the head 23 adjacent the casing 62 with the outer ends of said rods swinging into the notch between correspondingly located pairs of ears 66 formed upon the casing end 63. Beyond said ears thumb nuts are run on to the outer ends of said tie-rods 67. By loosening said thumb screws 69 the rods may obviously be swung clear of the casing, whereupon the casing may be bodily removed from the head and thereafter if desired the movable valve member 51, the partition 54 and the screw conveyor 47 and shaft 48 may all be removed together from the machine. As seen more particularly in Figs. 3 and 5 there is provided an outlet aperture 70 in the cylindrical portion of the casing 62 corresponding in length and width to the outlet aperture 61 in the removable valve member. The outlet aperture 70 is located at the bottom of the casing 62 so that as the outlet aperture 61 of the movable member and the outlet aperture 70 of the casing 62 register to a greater or lesser extent the food theretofore forced into the chamber of outlet cutoff valve will fall by gravity into a container or chute, not shown. The clearing of the chamber of said cutoff valve will be aided by the slight steam pressure within the chamber of said valve and by the rotating movement of its member 51 which constantly tends to dump the food towards the opening at the bottom of the valve.

Beneath the several heating tubes, 11, 12, 13 and 14 there are provided steam pipes 71, 72, 73 and 74 respectively. These steam pipes are mounted as close as practicable to the respective heating tubes to be supplied therefrom and the steam passes upwardly from said pipes into the respective tubes through apertures 75 in the top of the steam pipes and oppositely located apertures 76 in the bottom of the co-operating tube. The passageways to the steam pipes to the tubes are made steam tight by suitable filling 77 loaded into the narrow space between the steam pipes and the tubes through which filling of course an opening is formed when the holes 76 and 75 are drilled.

The ends of the said steam pipes toward the outer or forward head 23 are securely mounted and also closed by being let into shallow recesses 78 formed in said outer head. The inner ends of said steam pipes are mounted in apertures 79 formed in the inner head 22. Into the outer ends of these apertures 79 extend the ends of suitable connecting pipes 81 leading to a suitable source of steam. One or more steam pipes as 80$^a$ extending through head 22 are provided to conduct steam into the space outside the tubes 11, 12, 13 and 14 and within the encircling jacket 15.

An adjusting bolt 81 with lock nut 82 thereon may extend through the end 63 of the casing 62 to engage the end of a spring 83 let into a socket in the forward end of the shaft 48. This arrangement admits of the necessary and careful adjustment of the shaft 48 and the rotating valve member 61 mounted thereon.

It will now be seen that I have provided a machine in which the food in bulk may be heated very thoroughly to as high a temperature as necessary and that the means for moving the food and transferring it from the higher to successive lower heating chambers and reversing the longitudinal direction of its travel several times, all tends to very thorough and uniform heating of the food. It will be noted particularly that a great deal of the heat is imparted to the food without adding further moisture thereto through the heating tubes or chambers being at all times kept thoroughly heated by the live steam admitted to the space between the food containing tubes and the outside jacket 15. It will be noted further that the live steam admitted to the heating chambers is admitted to the bottom of said chambers where the food is located so that the most effective use is made of the steam entering said chambers. Arranging the heating chambers in overlapping relation and in closely grouped formation obtains also great economy in the heating efficiency of the device and particularly of the heat imparted to the space within the single jacket 15. A further advantage of this overlapping arrangement of the heating chambers is that thereby sufficient travel is provided to thoroughly heat the food and still keep the machine very compact and relatively short. It is a special advantage to make the machine as compact and short as possible in that it is always desirable to have the "line" that is the successive machines necessary to perform the full canning operation as short as possible. It is especially desirable also that this machine should be as short and compact as possible in that this pre-heating step or machine is an additional step being installed in many canning factories. In making this machine short it can be installed in the line without having to relocate the preceding or successive machines, which relocation is always a troublesome operation and in many plants would be impossible on account of lack of space. It will be noted particularly that the machine can be very readily taken apart enough to allow of thorough cleansing of all parts through which the food passes or with which the food comes in contact.

As successive batches of food are dropped into the chamber 24 below the rotating inlet cutoff valve by the rotation of said valve the food is carried forwardly by the conveyor in the upper tube 11 until it reaches the two ports 32 and 33. The food then by the action of said conveyor and the weight of said food passes downwardly in a slanting direction to the two intermediate tubes 12 and 13. From here the food is again conveyed rearwardly until it reaches the rear ends of said tubes when it again passes downwardly in a slanting direction through the two ports 42 and 43 into the rear end of the bottom tube 14. From this point the food is again conveyed forwardly through the screw conveyor in said bottom tube until it reaches the forward end of said tube. The constant rotation of this screw conveyor accumulates the food to a greater or less extent against the partition 54, then as the rotation of the valve member 51 of the outlet cutoff valve 11 brings the aperture 59 of said valve member into line with the opening 55 in the partition 54, the continued rotation of the screw conveyor aided by the steam pressure in the tube 14 forces a quantity of food into the chamber of the cutoff valve. As already mentioned some steam also passes out into the valve with the food, but not much steam is thus lost. Further rotation of the valve member 51 gradually moves the inlet opening 59 out of register with the opening 55 in the partition 54 and soon after opens the valve at the bottom by bringing the opening 61 into register to a greater or less extent with the opening 70 in the bottom of the casing 62 of this valve.

By having two intermediate and smaller return heating tubes 12 and 13 a good, economical and efficient construction of the device is obtained in that a more direct fall of the food is obtained through the connecting ports by reason of the smaller intermediate tubes 12 and 13 being capable of being placed closer to the plane of the axis of the upper and bottom tubes 11 and 14. Furthermore a more compact arrangement of the tubes may be had resulting in the surrounding jacket being of less diameter than would be possible with a series of three similar sized tubes

What I claim as new and desire to secure by Letters Patent is:

1. In a continuous process machine for heating food in bulk the combination of a tubular food chamber, an imperforate casing surrounding and spaced from said chamber, means to supply steam to the space between said chamber and said casing, a cut-off valve for admitting the food to the inlet end of the chamber, a cut-off valve at the outlet end of said chamber, means for continuously moving the food through the chamber and into the outlet cut-off valve and means for operating said cut-off valves and said conveyor means.

2. In a continuous process machine for heating food in bulk the combination of a tubular food chamber, an imperforate casing surrounding and spaced from said chamber, means to supply steam to the space between said chamber and said casing, means to supply live steam to said chamber, a cut-off valve for admitting the food to the inlet end of the chamber, a cut-off valve at the outlet end of said chamber, means for continuously moving the food through the chamber and into the outlet cut-off valve and means for operating said cut-off valves and said conveyor means.

3. In a continuous process machine for heating food in bulk the combination of a tubular food chamber, an imperforate casing surrounding and spaced from said chamber, means to supply steam to the space between said chamber and said casing, a cut-off valve for admitting the food to the inlet end of the chamber, a cut-off valve at the outlet end of said chamber, a screw conveyor for moving the food through the chamber and into the outlet cut-off valve and means for operating said cut-off valves and said screw conveyor.

4. In a continuous process machine for heating food in bulk the combination of a tubular food chamber, an imperforate casing surrounding and spaced from said chamber, means to supply steam to the space between said chamber and said casing, means to supply live steam to said chamber, a cut-off valve for admitting the food to the inlet end of the chamber, a cut-off valve at the outlet end of said chamber, a screw conveyor for moving the food through the chamber and into the outlet cut-off valve and means for operating said cut-off valves and said screw conveyor.

5. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, means for continuously moving the food through the successive chambers and into the outlet cut-off valve, means for operating said cut-off valves and said conveyor means, and means to supply heat to said chambers.

6. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, screw conveyors for moving the food through the successive chambers and into the outlet cut-off valve, means for operating said cut-off valves and said screw conveyors and means to supply heat to said chambers.

7. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, means for continuously moving the food through the successive chambers and into the outlet cut-off valve, means for operating said cut-off valves and said conveyor means and means to supply live steam to said chambers.

8. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, means for continuously moving the food through the successive chambers and into the outlet cut-off valve, means for operating said cut-off valves and said conveyor means, a casing surrounding said group of chambers and spaced therefrom and means to supply live steam to the space between said casing and the chambers.

9. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, means for continuously moving the food through the successive chambers and into the outlet cut-off valve, means for operating said cut-off valves and said conveyor means, means to supply heat to said chambers and a casing surrounding said group of chambers and spaced therefrom and means to supply live steam to the space between said casing and the chambers.

10. In a continuous process machine for heating food in bulk the combination of a plurality of closely-grouped tubular food chambers extending back and forth with the exit end of the several chambers except the last communicating with the entrance end of the successive chamber, a cut-off valve for admitting the food to the inlet end of the first chamber, a cut-off valve for passing the food from the outlet end of the last chamber, means for continuously moving the food through the successive chambers and into the outlet cut-off valve, means for operating said cut-off valves and said conveyor means, means to supply live steam to said chambers, a casing surrounding said group of chambers and spaced therefrom and means to supply live steam to the space between said casing and the chambers.

11. In a continuous process machine for heating food in bulk, the combination of a tubular food heating chamber, a tubular casing opposite the outlet of said chamber and having an aperture in the lower side, a partition at the outlet end of the chamber having an aperture at its lower side, a rotating, hollow cylindrical cut-off valve member in said casing having an inlet opening in its end adjacent said partition adapted at one position of the valve member to register with said partition aperture and having an outlet opening in its side away from said end opening adapted to register with said aperture in the casing, a screw conveyor in the heating chamber to force the food towards the outlet and a shaft extending through said chamber and said valve member to operate said conveyor and said valve member.

In witness whereof I have affixed my signature, this 29th day of January 1924.

GEORGE J. OLNEY.